US012468938B2

(12) United States Patent
Rodrigo Cavalin et al.

(10) Patent No.: US 12,468,938 B2
(45) Date of Patent: Nov. 11, 2025

(54) TRAINING EXAMPLE GENERATION TO CREATE NEW INTENTS FOR CHATBOTS

(71) Applicant: International Business Machines Corporation, Armonk, NY (US)

(72) Inventors: Paulo Rodrigo Cavalin, Rio de Janeiro (BR); Ana Paula Appel, Sao Paulo (BR); Bruno Silva, Sao Paulo (BR); Renato Luiz de Freitas Cunha, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 17/480,398

(22) Filed: Sep. 21, 2021

(65) Prior Publication Data

US 2023/0092274 A1 Mar. 23, 2023

(51) Int. Cl.
*G06N 3/08* (2023.01)
*G06F 16/2455* (2019.01)
*G06N 3/006* (2023.01)
*G06N 3/042* (2023.01)

(52) U.S. Cl.
CPC .......... *G06N 3/08* (2013.01); *G06F 16/2455* (2019.01); *G06N 3/006* (2013.01); *G06N 3/042* (2023.01)

(58) Field of Classification Search
CPC .......... G06N 3/08; G06N 3/006; G06N 3/042; G06N 3/044; G06N 20/00; G06N 5/041; G06F 16/2455
See application file for complete search history.

(56) References Cited

U.S. PATENT DOCUMENTS

| | | | |
|---|---|---|---|
| 6,959,417 B2 | 10/2005 | Gupta | |
| 7,249,117 B2 | 7/2007 | Estes | |
| 8,103,735 B2 | 1/2012 | Adams et al. | |
| 8,935,150 B2 | 1/2015 | Christ | |
| 8,949,132 B2 | 2/2015 | Bangalore et al. | |
| 9,621,601 B2 | 4/2017 | Johnson, Jr. et al. | |

(Continued)

FOREIGN PATENT DOCUMENTS

| | | |
|---|---|---|
| CN | 105144040 B | 3/2018 |
| JP | 2019-506659 A | 3/2019 |

(Continued)

OTHER PUBLICATIONS

Pinhanez, C., et al., "Using Meta-Knowledge Mined from Identifiers to Improve Intent Recognition in Neuro-Symbolic Algorithms", arXiv:2012.09005v1, Dec. 16, 2020, 9 pages.

(Continued)

*Primary Examiner* — Dave Misir
(74) *Attorney, Agent, or Firm* — Scully, Scott, Murphy & Presser, P.C.; Anthony Mauricio Pallone

(57) ABSTRACT

A topic for building a new intent on which to train a chatbot can be received. A database of chatbot training data can be searched for a candidate intent having meta-knowledge similar to the received topic. Utterances associated with the candidate intent can be extracted. The received topic and the extracted utterances can be input to a trained machine learning model. The trained machine learning model generates example utterances for the new intent. The new intent with the generated example utterances can be used as training data for training the chatbot.

14 Claims, 12 Drawing Sheets

(56) References Cited

U.S. PATENT DOCUMENTS

| | | |
|---|---|---|
| 10,127,274 B2 | 11/2018 | Moreno et al. |
| 10,339,453 B2 | 7/2019 | Balani et al. |
| 10,460,042 B2 | 10/2019 | Byron et al. |
| 10,498,898 B2 | 12/2019 | Mazza et al. |
| 10,592,504 B2 | 3/2020 | Moreno et al. |
| 10,769,380 B2 | 9/2020 | Reiter |
| 10,916,237 B2 | 2/2021 | Yan et al. |
| 11,194,966 B1 | 12/2021 | Appel et al. |
| 11,562,028 B2 | 1/2023 | Appel et al. |
| 11,677,692 B2 | 6/2023 | Rodrigo Cavalin et al. |
| 2011/0125734 A1 | 5/2011 | Duboue et al. |
| 2014/0279050 A1 | 9/2014 | Makar et al. |
| 2016/0260029 A1 | 9/2016 | Gelfenbeyn et al. |
| 2017/0235841 A1 | 8/2017 | Li et al. |
| 2018/0025726 A1 | 1/2018 | Gatti De Bayser et al. |
| 2018/0052664 A1 | 2/2018 | Zhang et al. |
| 2018/0131645 A1 | 5/2018 | Magliozzi et al. |
| 2019/0124020 A1 | 4/2019 | Bobbarjung et al. |
| 2019/0361977 A1* | 11/2019 | Crudele ................ G06F 40/211 |
| 2020/0111486 A1 | 4/2020 | Gelfenbeyn et al. |
| 2020/0142719 A1 | 5/2020 | Akbulut et al. |
| 2021/0082400 A1* | 3/2021 | Vishnoi ................ G06F 40/284 |
| 2021/0304733 A1* | 9/2021 | Jalaluddin ............... G10L 15/26 |
| 2021/0390951 A1* | 12/2021 | Gadde .................... G06F 40/30 |
| 2022/0021630 A1* | 1/2022 | Goyal ..................... G06N 3/08 |
| 2022/0139372 A1* | 5/2022 | Muschett ............. G06F 40/216 |
| | | 704/257 |

FOREIGN PATENT DOCUMENTS

| | | |
|---|---|---|
| KR | 2017-0046611 A | 5/2017 |
| KR | 2019-0055425 A | 5/2019 |

OTHER PUBLICATIONS

Acharya, S., et al., "Using Optimal Embeddings to Learn New Intents with Few Examples: An Application in the Insurance Domain", KDD Converse'20, Aug. 2020, 8 pages.

Liu, X., et al., "metaCAT: A Metadata-based Task-oriented Chatbot Annotation Tool", In Proceedings of the 1st Conference of the Asia-Pacific Chapter of the Association for Computational Linguistics and the 10th International Joint Conference on Natural Language Processing: System Demonstrations, Dec. 2020, pp. 20-25.

Bradesko, L., et al., "Curious Cat-Mobile, Context-Aware Conversational Crowdsourcing Knowledge Acquisition", ACM Transactions on Information Systems (TOIS), 2017, 49 pages, 35(4).

Schmitt, T., et al., "Improving NLU Training over Linked Data with Placeholder Concepts", https://link.springer.com/chapter/10.1007/978-3-030-33220-4_6, First Online Nov. 4, 2019, Semantics 2019, pp. 67-82, LNCS 11702.

Rasa Technologies Inc., "Open source conversational AI", https://rasa.com/, Accessed on Sep. 21, 2021, 10 pages.

Wong, E., et al., "AutoComment: Mining Question and Answer Sites for Automatic Comment Generation", 2013 28th IEEE/ACM International Conference on Automated Software Engineering (ASE 2013), Nov. 11-15, 2013, pp. 562-567.

Rao, S., "Answer-based Adversarial Training for Generating Clarification Questions", arXiv:1904.02281v1, Apr. 4, 2019, 14 pages.

* cited by examiner

TRAINING EXAMPLE GENERATION TO CREATE NEW INTENTS FOR CHATBOTS

BACKGROUND

The present application relates generally to computers and computer applications, and more particularly to machine learning, neural networks, chatbots, voicebots, and generating training examples for machine learning.

Machine learning may use training data examples to train a model to be able to autonomously or automatically perform a given task. For example, a computer-implemented device or application such as a chatbot or a voicebot, can be trained to carry on a conversation with a user. Such a device or application can be trained on training sample dataset gathered from previous experiences. For instance, a chatbot or like application or device, or a speech language understanding system, which may also include a chatbot, can be trained on intents collected as training data. However, oftentimes, the task of gathering training examples for the new intents may present to be laborious and it may also be that there is not enough available data to gather.

BRIEF SUMMARY

The summary of the disclosure is given to aid understanding of a computer system and method of creating intents for chatbots or speech language understanding system or the like, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include receiving a topic for building a new intent on which to train a chatbot. The method can also include searching a database of chatbot training data for a candidate intent having meta-knowledge similar to the received topic. The method can also include extracting utterances associated with the candidate intent. The method can also include inputting the received topic and the extracted utterances to a trained machine learning model, the trained machine learning model generating example utterances for the new intent.

In another aspect, a method of generating training examples as new intents for chatbot training, can include receiving a topic for building a new intent on which to train a chatbot. The method can also include searching a database of chatbot training data for a candidate intent having meta-knowledge similar to the received topic. The method can also include extracting utterances associated with the candidate intent. The method can also include inputting the received topic and the extracted utterances to a trained machine learning model, the trained machine learning model generating example utterances for the new intent. The extracted utterances can include a question associated with the candidate intent, and the example utterances generated by the trained machine learning model can include a question associated with the topic. The method can further include searching for an answer for responding to the question associated with the topic.

In yet another aspect, a method of generating training examples as new intents for chatbot training, can include receiving a topic for building a new intent on which to train a chatbot. The method can also include searching a database of chatbot training data for a candidate intent having meta-knowledge similar to the received topic. The method can also include extracting utterances associated with the candidate intent. The method can also include inputting the received topic and the extracted utterances to a trained machine learning model, the trained machine learning model generating example utterances for the new intent. The extracted utterances can include a question associated with the candidate intent, and the example utterances generated by the trained machine learning model can include a question associated with the topic. The method can further include searching for an answer for responding to the question associated with the topic. The method can further include training the chatbot using the new intent including the example utterances and the answer.

In yet still another aspect, a method of generating training examples as new intents for chatbot training, can include receiving a topic for building a new intent on which to train a chatbot. The method can also include searching a database of chatbot training data for a candidate intent having meta-knowledge similar to the received topic. The method can also include extracting utterances associated with the candidate intent. The method can also include inputting the received topic and the extracted utterances to a trained machine learning model, the trained machine learning model generating example utterances for the new intent. The extracted utterances can include a question associated with the candidate intent, and the example utterances generated by the trained machine learning model can include a question associated with the topic. The method can further include searching for an answer for responding to the question associated with the topic. The method can further include validating the answer.

In another aspect, a method of generating training examples as new intents for chatbot training, can include receiving a topic for building a new intent on which to train a chatbot. The method can also include searching a database of chatbot training data for a candidate intent having meta-knowledge similar to the received topic. The method can also include extracting utterances associated with the candidate intent. The method can also include inputting the received topic and the extracted utterances to a trained machine learning model, the trained machine learning model generating example utterances for the new intent. The machine learning model can include a neural network.

A system including at least a processor and a memory device, where one or more processors can be configured to perform one or more of methods described herein can also be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
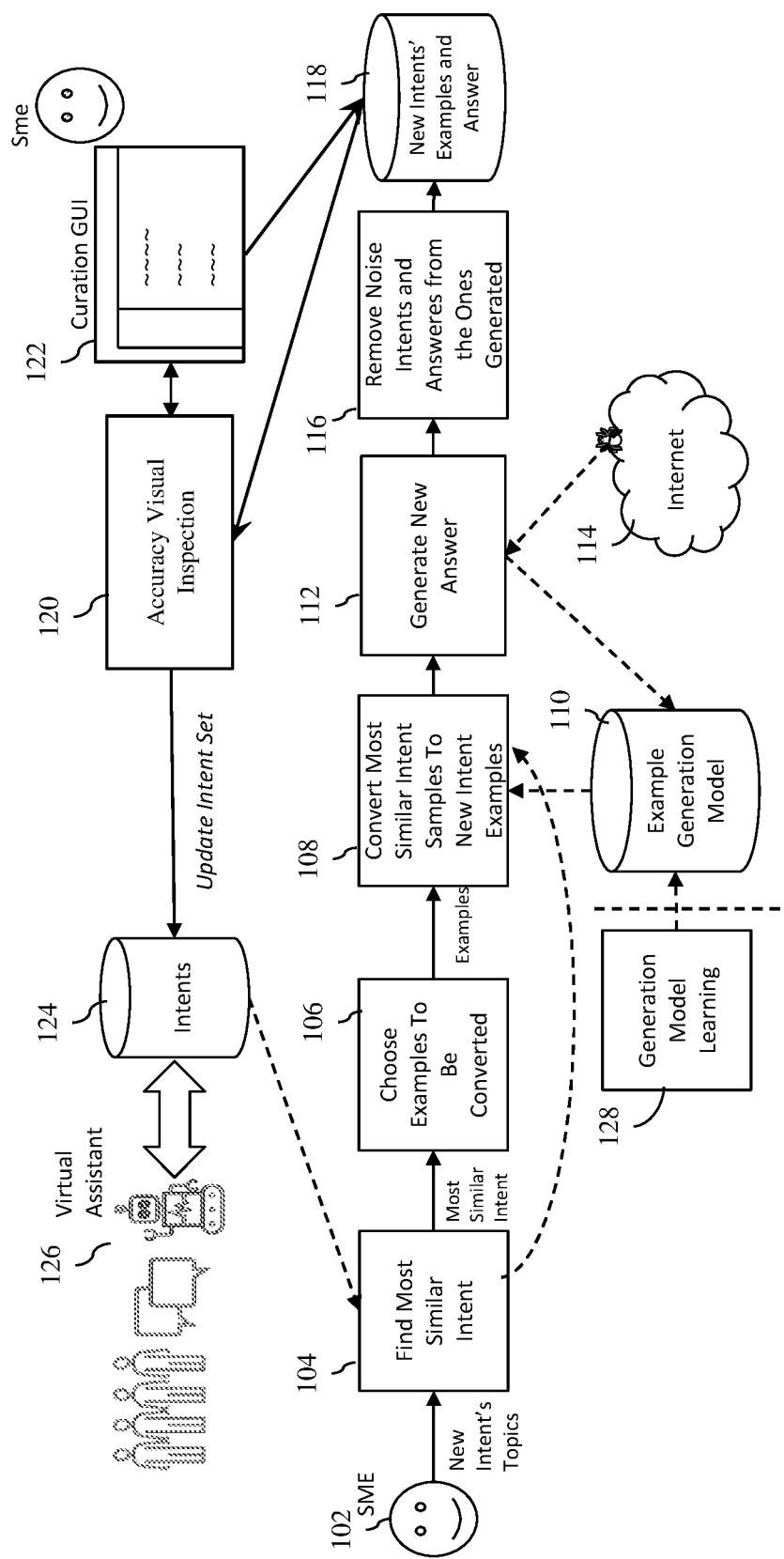
FIG. 1 is a diagram illustrating an overview of generating training examples to create new intents for chatbots in an embodiment.

A chatbot (also referred to as a bot) can be an automated computer process running on a computer, e.g., software, firmware, and/or programmed hardware, which can carry on a conversation with a human user or another automatic computer process. A chatbot can be programmed using artificial intelligence techniques such as machine learning (ML) and natural language processing (NLP). The conversation can be performed via text and/or speech. A chatbot can be an automated computer process that can interact with a user by carrying on a conversation such as answering a question, providing guidance or instructions for performing an act, and/or another. A chatbot can be trained using one or more machine learning techniques using training data which can include intents.

While the present disclosure is described using the term "chatbots", the systems, methods and techniques described herein can apply to voicebots and/or other speech language understanding technology.

A chatbot can include an intent classifier. An intent is an action the user expects the chatbot to do. An intent classifier can be a text classifier with N classes. Training samples include a set of text examples used to train the chatbot for handling each intent. Collecting and curating training samples for new intents are not easy tasks. For instance, for each new intent, a set of examples may need to be collected by a subject matter expert (SME) and it may be that the data curation process gets done from scratch or anew for each new intent. Frequently, considerable time is spent on the curation and enhancement of examples for an intent. Tools such as clustering can help identify examples from external sources such as call logs and social media.

In one or more embodiments, systems and methods can be provided for creating new intents and for updating the content of a chatbot. For instance, new intents can be created automatically and the chatbot can be updated or retrained automatically. For instance, systems and methods can be provided to handle the update of the knowledge of chatbots, e.g., the set of intents for which the chatbot can provide a response. In an embodiment, the systems and methods may implement controllable text generation to create synthetically generated examples for the new intents, to use as training data for training a chatbot. The user, e.g., the chatbot developer, can be allowed to input high-level meta-knowledge to characterize the new content, and a system and/or method in an embodiment can search for similar existing intents and generate the text for the training samples. The system and/or method can also validate the generated examples by searching for documents that provide answers for the generated questions.

In an embodiment, a system and/or method can generate training examples to create new intents for chatbots, helping chatbot developers to create new intents and update the content of a chatbot, using controllable text generation, relying on knowledge from previously-created intents, to suggest samples to be used to train an intent classifier for the new intents. For example, a user need only input high-level meta-knowledge into the system, and the system may search for and suggest possible new intents based on the similarity of the meta-knowledge with existing content (e.g., questions that have already been curated by subject matter experts for question generation for other topics), also verify the proposed examples, and suggest documents that can be used to create chatbot responses.

In an aspect, the systems and/or methods can speed up the process of updating a chatbot to accommodate new intents, for example, and reduce a need for conducting laborious data gathering steps to set up initial sets of examples for each new intent.

FIG. 1 is a diagram illustrating an overview process of generating training examples to create new intents for chatbots in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Input can be received from a user, e.g., an SME, a chatbot developer, or the like 102. Input received can include a high-level meta-knowledge of a new intent. High-level meta-knowledge, for example, can be a topic or subject matter, for example, given as a token, e.g., a phrase and/or word.

At 104, a processor may search for the intents which present a threshold degree of similarity in terms of meta-knowledge. For example, a processor may search a database of chatbot intents, which are used as training data for training a chatbot to converse or carry on a dialog with a user. The threshold degree or similarity threshold can be preconfigured or predefined, and can be received from a user, e.g., as an input. In an embodiment, the similarity can be measured in terms of semantic similarity between the topic and meta-knowledge. One or more natural language processing techniques can be used to find or determine semantic similarity between terms (e.g., terms in the topic and the terms in meta-knowledge). Other techniques such as ontology of concepts can be utilized to determine similarity.

At 106, the processor may select examples to be converted, from the similar intents. In an embodiment, samples that may result in affecting classification accuracy such as those that are too generic or without clear evidence of the meta data of the similar intent, can be discarded. In an embodiment, a sample can be discarded even after it is used initially to generate an output. For example, an example way to measure whether a sample is to be discarded can be, to compare the input with the generated output. If they are too similar (e.g., based on a threshold level), then the generated output, i.e. an example created for the new intent, can be discarded to avoid inter-class confusion.

At 108, the processor may generate the examples for the new intents, based on an example generation model (EGM) 110. EGM 110 is a learned model, for example, trained at 128.

At 112, the processor may generate the answer for the new intents, e.g., with the EGM 110 or by looking into external documents or content 114, e.g., the Internet or another available source. According to the requirements for the answer of the new intent, i.e. the answers are supposedly very similar, answers may be directly generated with the EGM from the answer of the similar intent. In another aspect, search on external documents can be performed for the answer to the new intent.

At 116 the generated intents, example utterances (e.g., questions) and answers can be filtered to remove any noise. The generated intents, example utterances and answers, e.g., with noise removed, can be stored in a repository or database, for example, on a storage device or memory device 118.

At 120, the pairs of training examples (e.g., questions and answer), representing the new intents, can be validated with external documents, and can be shown to the SME in the curation graphical user interface (GUI) 122. Those pairs include a set of training examples for the new intents, and an answer either generated with the EGM or from a search on external documents. In an embodiment, those examples considered to be valid, after the validation at 120, can be shown to the SME in the curation GUI 122. In a loop (e.g., iteratively), the SME can manually validate and correct the generated content. Once the results are satisfactory, e.g., and approved by the SME, the new intents can be appended to the chatbot's set of intents 124, and the Virtual Assistant or chatbot 126 can be updated.

Figure 2:
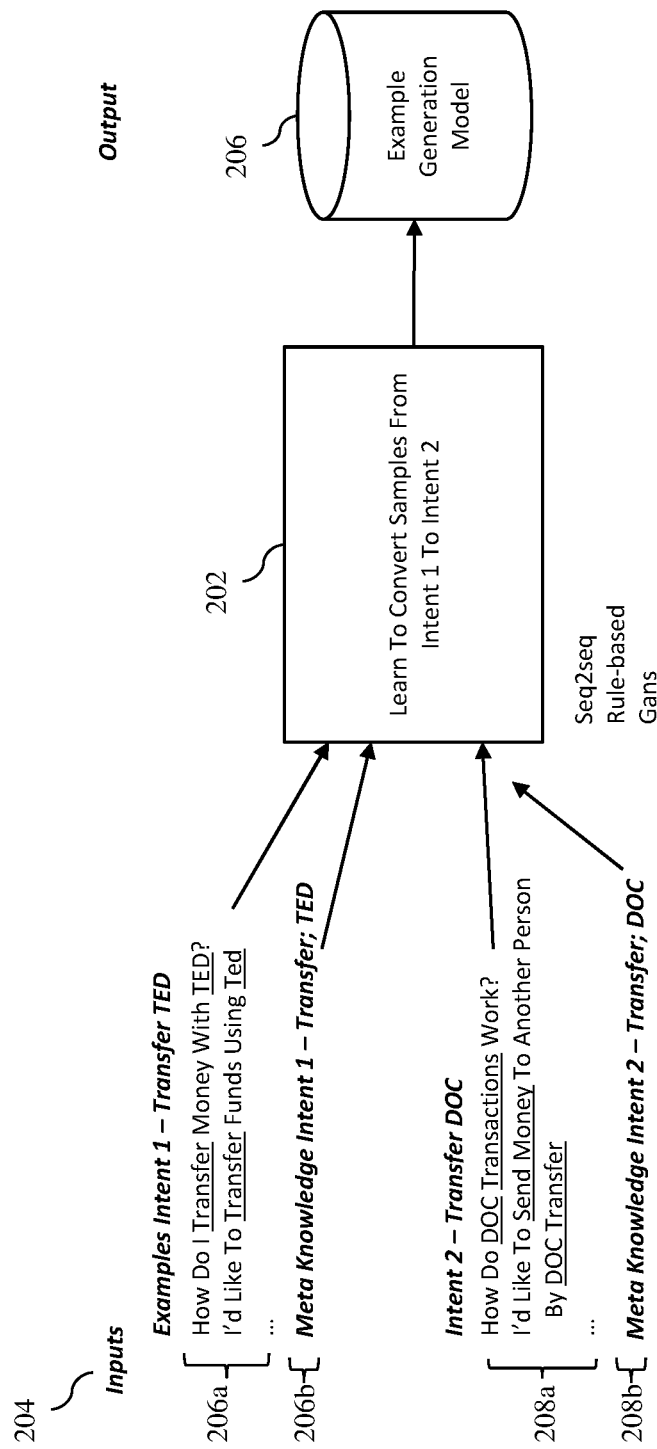
FIG. 2 is a diagram illustrating an overview of a learning module for training an example generation model in an embodiment.

FIG. 2 is a diagram illustrating an overview of learning or training example generation model (e.g., FIG. 1 at 110, 128) in an embodiment, e.g., creating EGM. A learning model 202, also referred to as "learn to convert samples" model can receive as input 204, pairs of intent samples. A pair of intent sample can include one or more questions or utterances (also referred to as "examples") associated with an intent (e.g., 206a) and a meta-knowledge associated with the intent (e.g., 206b). A plurality of such pairs (e.g., 206a, 206b; 208a, 208b, . . . ) can be received. The learning model 202 can include machine learning models such as Seq2seq Neural Networks, Generative Adversarial Networks (GANs), rule-based algorithms, and/or another. The learning module 202 learns to convert example utterances from one intent to another given the meta-knowledge associated with the intents, for example, using gradient descent algorithm. For instance, the examples (e.g., 206a, 208a) can be used as ground truth data for training the learning module 202. The model uses both the intent examples (206a, 208a) and the meta-knowledge (206b, 208b) to learn the conversion from intent 1 to intent 2, and outputs or generates the EGM (learned model) as the end result. For example, in an embodiment, a sequence-to-sequence (seq2seq) neural network can be learned with the examples and the meta-knowledge from intent 1 in the input, and the examples and meta-knowledge from intent 2 are used in the output as ground truth. As another example, in an embodiment, other types of models such as Generative Adversarial Networks (GANs) may be used. For instance, with GANs, instead of converting examples from intent 1 to intent 2, the model can learn how to generate new examples given the input samples and meta-knowledge from either intent.

Figure 3:
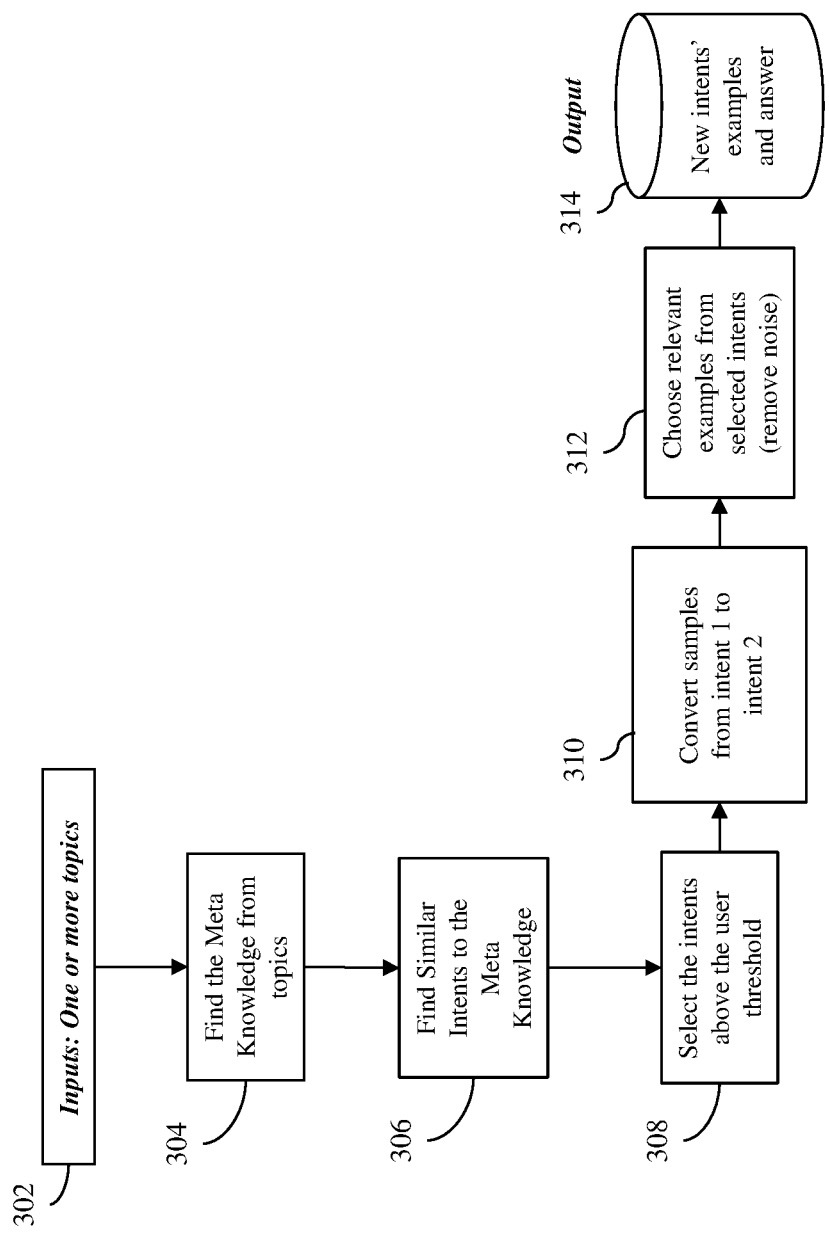
FIG. 3 is a diagram illustrating a method of generating training examples in an embodiment.

FIG. 3 is a diagram illustrating a method of generating training examples in an embodiment. The method can be performed by or implemented on one or more hardware processors. The method flow in an embodiment illustrates the process shown in FIG. 1, for example, at 104, 106, 108, 112, 116 and 118. At 302, input can be received. Input can include one or more topics. For instance, a user may input topic, for which an intent and corresponding questions (utterances) are to be created, as training data for training a chatbot.

At 304, the method can include finding meta-knowledge associated with the received one or more topics, for example, from a database of intents and associated utterances. For example, a topic can be mapped to meta-knowledge corresponding to an intent. In an embodiment, a topic can be the same as a meta-knowledge, or different. An example of an intent can be "transfer X"; an example of a meta-knowledge corresponding to that intent can be "transfer" and "X", where by way of example, "X" can be a type of payment or banking mechanism, for example, considering that a chatbot is answering questions regarding banking or payment transactions. In the same example, the metadata found can be different from the topic (e.g., but have a similar meaning). For example, an expression such as "send money" presents the same meaning as the topic "transfer".

At 306, the meta-knowledge in the input (e.g., determined at 304) is used to find intents with similar meta-knowledge. One or more techniques such as word embedding, taxonomy, or another technique can be used to find intents with similar meta-knowledge.

At 308, a predefined threshold is used to filter out irrelevant results. The predefined threshold, e.g., can be configured or given by a user. The filtered results include one or more intents and sample questions (utterances) associated with those intents.

At 310, using a learned or trained model, the sample questions in the filtered results are converted to utterances corresponding to the received topic. For instance, a new intent (corresponding to the received topic) and example utterances (e.g., questions) corresponding to the new intent are created based on the existing intents and utterances. The trained model can be a Seq2seq model, a rule-based model, a generative adversarial network (GAN), a graph neural network or another neural network, a word embedding model, and/or another. A machine learning technique can be implemented to train such a model.

At 312, the resulting generated examples are evaluated, e.g., for noise removal. For example, those that do not meet minimal values in metrics such as perplexity, can be discarded. Perplexity is an example of a metric that can compute whether a generated text possesses writing fluency similar to what is expected from a real person. An evaluation process can use other metrics that may make sense, such as cosine similarity, Euclidian distance and/or other P distance. In an embodiment, answers to the example questions can also be created, and the example-answer pair can be validated by comparing or correlating the example-answer pair with results crawled from the web.

At 314, the new intent, corresponding utterances (examples) and associated answers can be output. The output can be presented on a graphical user interface (GUI) for visualization. The output can also be stored in a database on a storage device.

Figure 4:
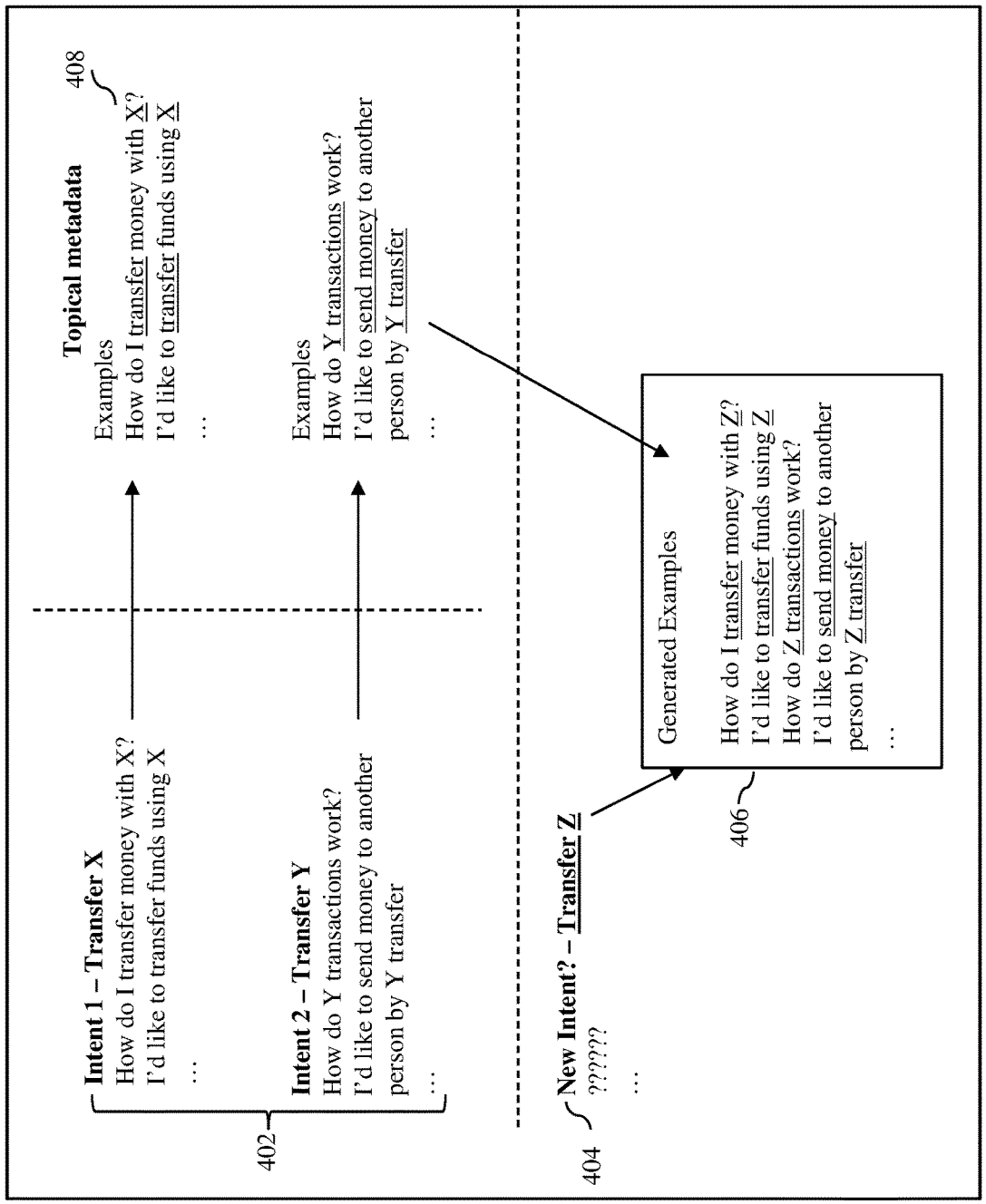
FIG. 4 illustrates examples of learning sample utterances for a new intent in an embodiment.

FIG. 4 illustrates examples of learning sample utterances for a new intent in an embodiment. Existing intents 402 can be used to generate examples for a new intent 404. In an embodiment, high-level knowledge such as topical cluster (also referred to as one or more topics) can be either automatically extracted from the intents or marked by users, and such high-level knowledge and the example can be used to train a model that is able to perform controllable text generation. For example, consider that "X", "Y", "Z" are different types of payment or banking methods. When learning to convert examples from Intent 1 to Intent 2 shown at 402, topics "transfer" and "X" are inputted together with examples from Intent 1, and topics "transfer" and "Y" are inputted together with examples from Intent 2. When creating a new intent "Transfer Z", then topics "Transfer" and "Z" can be used as inputs to generate samples from either Intent 1 or 2. The generated examples are shown at 406. Topical metadata 408 show topics or meta-knowledge (underlined text) that can be extracted automatically from example utterances. One or more topics or meta-knowledge can also be input by a user.

Figure 5:
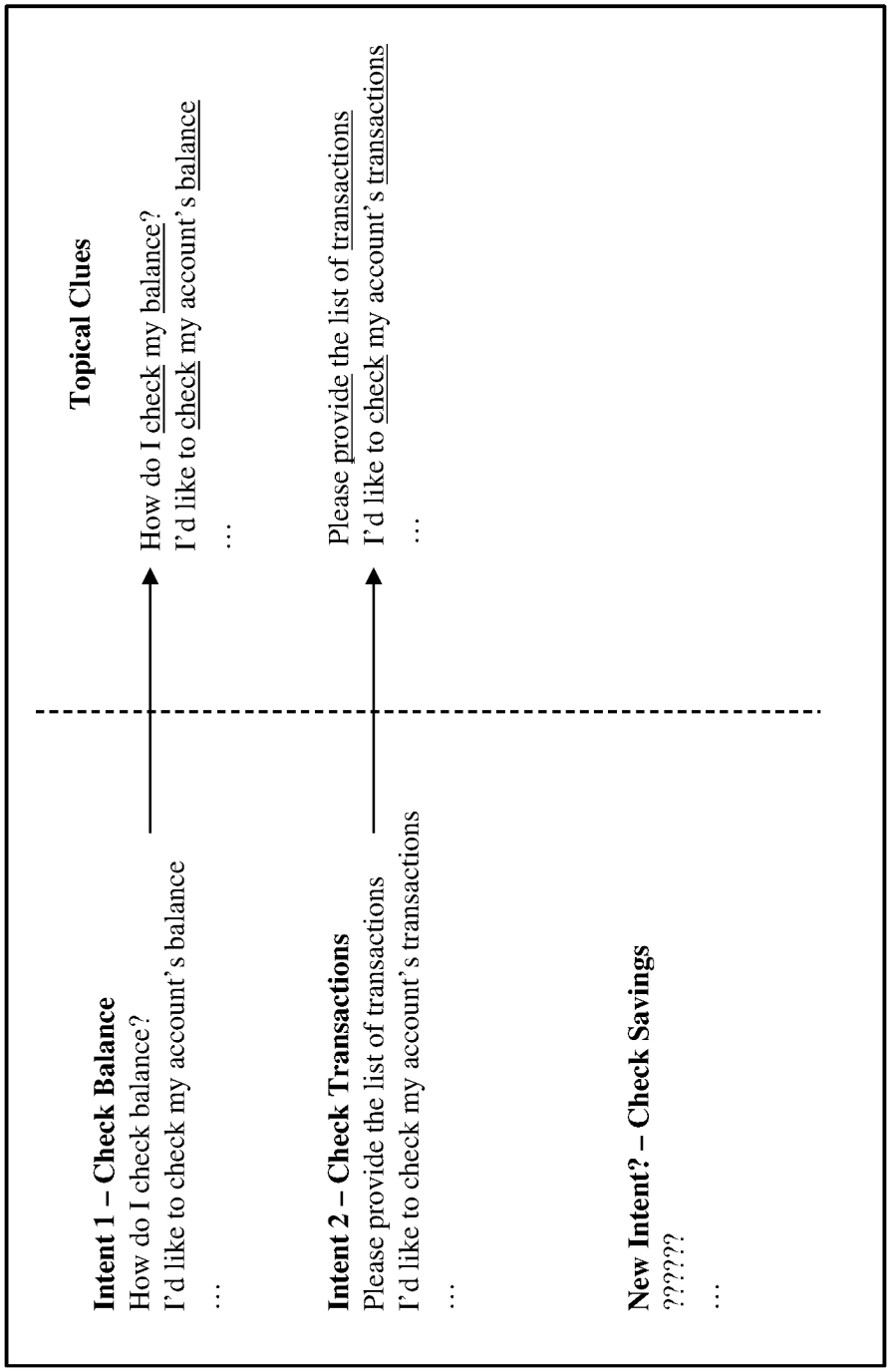
FIG. 5 illustrates another example of learning sample utterances for new intents in an embodiment.

FIG. 5 illustrates another example of learning sample utterances for new intents in an embodiment. For instance, for learning or training a model to convert examples from Intent 1 to Intent 2, topics "check" and "balance" can be inputted together with examples from Intent 1, and topics "check" and "transactions" can be inputted together with examples from Intent 2. When creating the new intent "Check Savings", topics "check" and "savings" can be used as input to generate samples from Intent 1 and/or Intent 2.

Figure 6:
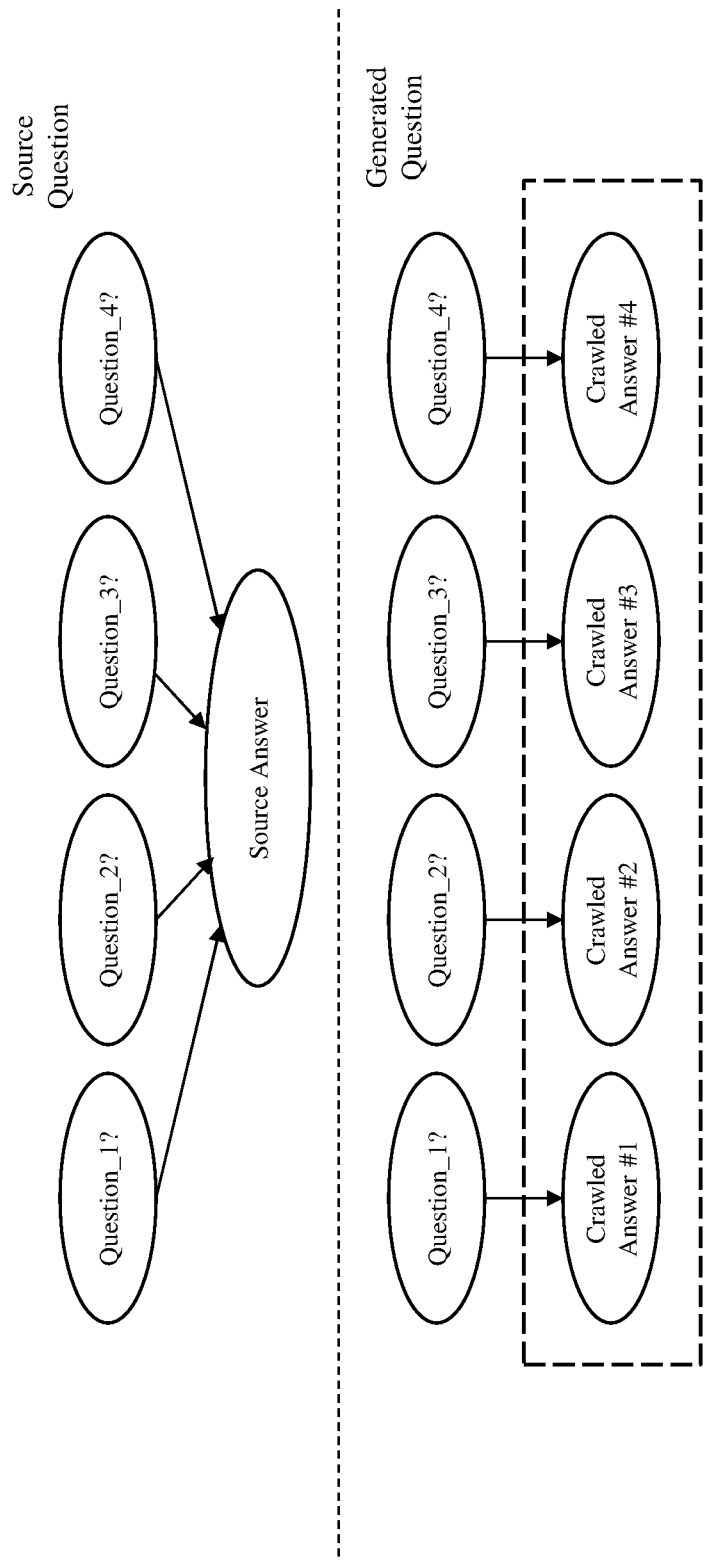
FIG. 6 is a diagram illustrating validating of generated examples in an embodiment.

FIG. 6 is a diagram illustrating validating of generated examples in an embodiment. Source questions and answer refer to those in the intent used to generate the examples and answer for the new intent. For example, a source question refers to a training example. The generated examples can be validated, considering pairs including the generated intent examples and answers generated with the EGM or crawled (e.g., searched) from external documents such as those available on the Internet or World Wide Web (Web) or others, as described above. Crawled answer refers to an answer generated from an external document such as from the Internet or the Web. The generated examples (questions and associated answers) can be ranked based on the quality or accuracy of a generated answer corresponding to a question in the generated examples, considering a question-answering query. For instance, the generated question-answer pair can be used to query for similar question-answer pair on the Web. The questions can be ranked in accordance with the matching score considering the generated answer, that is, the matching of the generated question-answer pairs with the results of the queries.

Figure 7:
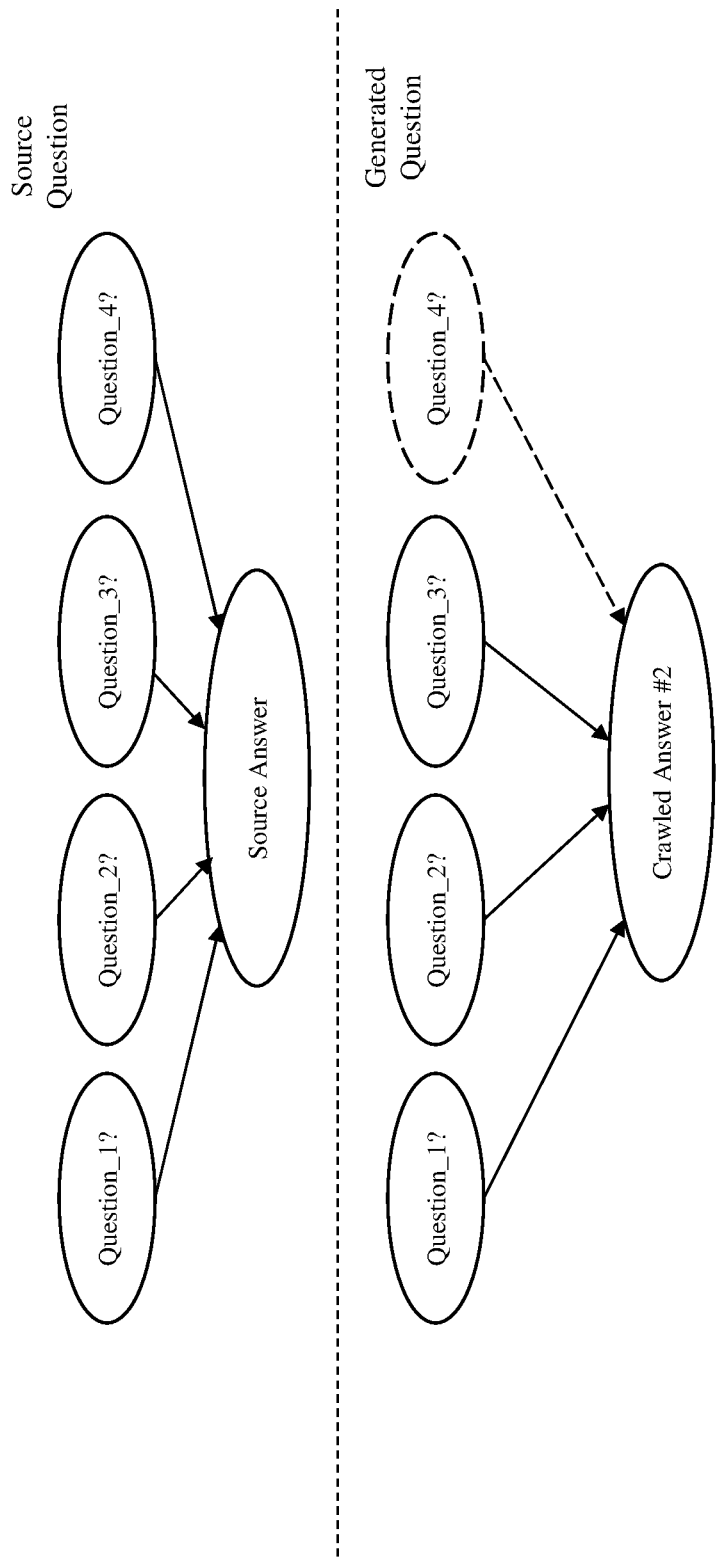
FIG. 7 is another diagram illustrating validating of generated examples in an embodiment.

FIG. 7 is another diagram illustrating validating of generated examples in an embodiment. This figure shows that from the different possible answers suggested by the system, "Crawled Answer #2" has been selected as being the most appropriate one.

Figure 8:
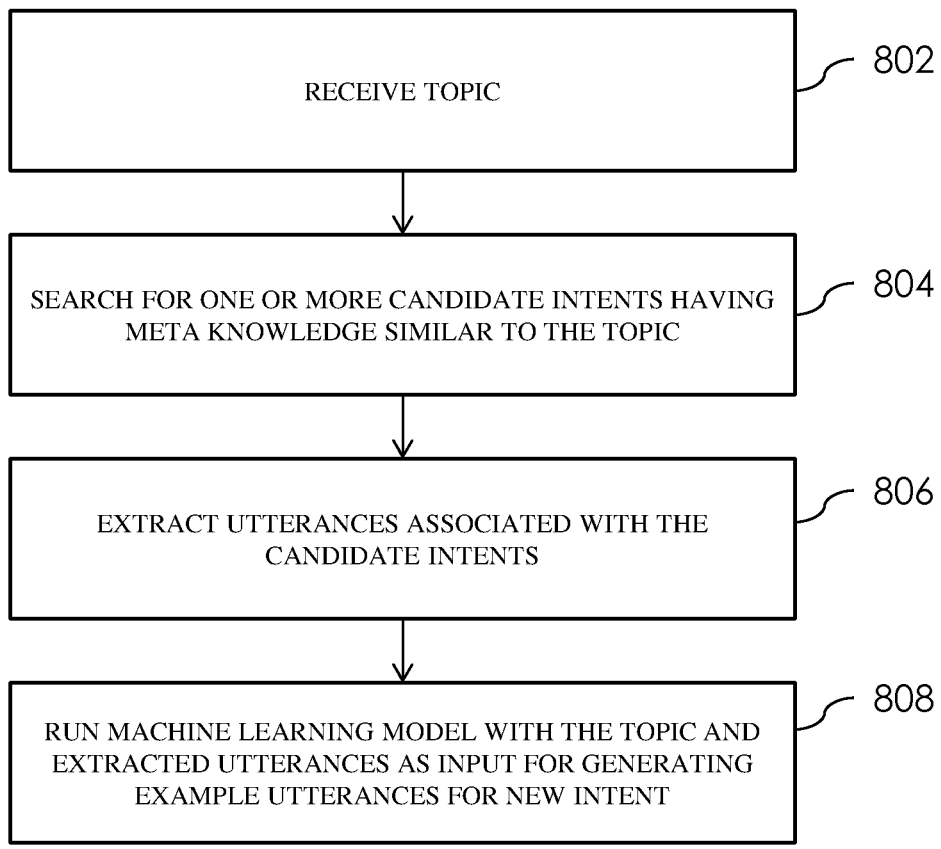
FIG. 8 is a flow diagram illustrating generating of training data examples in an embodiment.

FIG. 8 is a flow diagram illustrating a method of generating of training data examples in an embodiment. The method can be implemented on or run by one or more computer processors, for example, hardware processors. At 802, a topic can be received for building a new intent. The new intent can be used as training data for training a chatbot. For instance, the chatbot is trained to carry on a dialog with a user and/or answer questions a user may have about a subject matter or topic.

At 804, a database of chatbot training data can be searched for a candidate intent having meta-knowledge similar to the received topic. Similarity can be determined based on the similarity of semantic meaning and/or text. A threshold or similarity threshold can be predefined or preconfigured for meeting the similarity test (e.g., 90% similar or another metric for performing a similarity test). For instance, the database can store intent and utterances associated with that intent. Utterances, for example, can include questions, for instance, asked posed by a user to a chatbot, for the chatbot to answer.

At 806, utterances associated with the candidate intent are extracted or retrieved from the database. Examples of utterances are shown in FIG. 4 and FIG. 5.

At 808, the received topic and the extracted utterances can be input to a trained machine learning model. The trained machine learning model generates example utterances for the new intent. An example of the generated examples utterances for new intent are shown in FIG. 4 at 406. In an embodiment, the machine learning model can include a neural network and/or another machine learning model.

In an embodiment, the extracted utterances can include a question associated with the candidate intent, and the example utterances generated by the trained machine learning model can include a question associated with the received topic. In an embodiment, an answer can be identified, for example, searched for from available data, for example, on the Internet or from another source, for responding the question associated with the topic. In an embodiment, the method can also include training the chatbot using the new intent including the example utterances and the answer.

Figure 9:
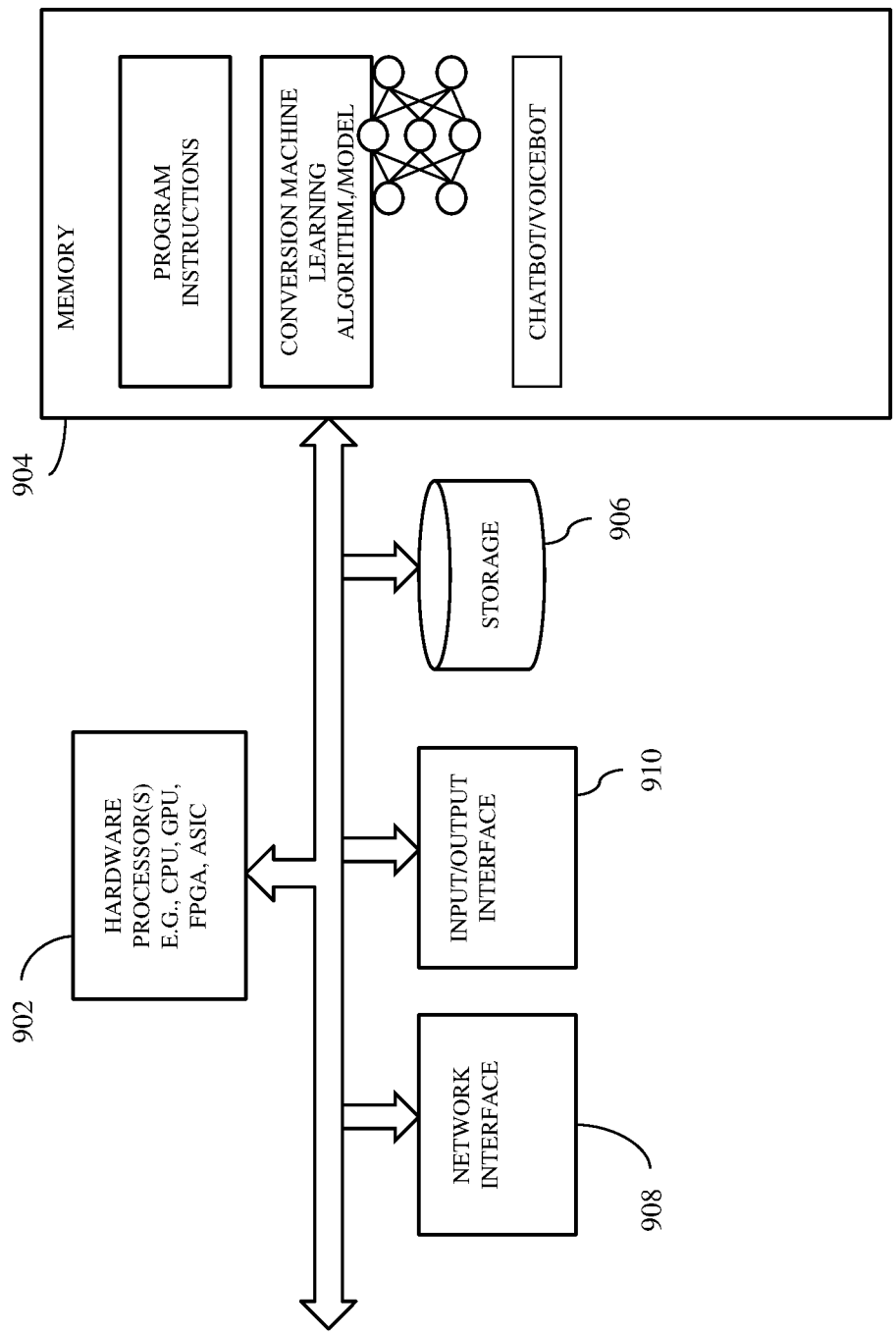
FIG. 9 is a diagram showing components of a system in one embodiment that can create new intents for chatbot training or update.

FIG. 9 is a diagram showing components of a system in one embodiment that can create new intents for chatbot training or update. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and generate a prediction model and recommend communication opportunities. A memory device 904 may include random access memory (RAM), read-only memory (ROM) or another memory device, and may store data and/or processor instructions for implementing various functionalities associated with the methods and/or systems described herein. One or more processors 902 may execute computer instructions stored in memory 904 or received from another computer device or medium. A memory device 904 may, for example, store instructions and/or data for functioning of one or more hardware processors 902, and may include an operating system and other program of instructions and/or data. One or more hardware processors 902 may receive input receive, which can include a topic for building a new intent on which to train a chatbot. One or more hardware processors 902 may search a database of chatbot training data for a candidate intent having meta-knowledge similar to the received topic. Chatbot training data can be stored locally in a storage device 906 and/or received via a network interface 908 (e.g., wired and/or wireless) from a remote device, and may be temporarily loaded into a memory device 904 for building or generating one or more chatbot intent examples. One or more hardware processors 902 may extract utterances associated with the candidate intent. One or more hardware processors 902 may input the received topic and the extracted utterances to a trained machine learning model, where the trained machine learning model generates example utterances for the new intent. The learned or trained machine learning model may be stored on a memory device 904, for example, for running by one or more hardware processors 902. One or more hardware processors 902 may be coupled with interface devices such as a network interface 908 for communicating with remote systems, for example, via a network, and an input/output interface 910 for communicating with input and/or output devices such as a keyboard, mouse, display, and/or others.

In an aspect, it may be that new intents can be similar to existing ones, but differ in some specific topic or metadata. In an aspect, the system may implement a controllable text generation, which can convert texts from some topics to others. In an aspect, the knowledge and the data curation of similar intents may be reused to train for new intents. In an aspect, a system may generate examples for new intents, using the topical clues or metadata to learn and generate examples for new intents. A controllable text generation can be used to create new examples from existing, similar intents, and leverage the data curation previously-conducted for those intents. Information retrieval on external documents can be used to collect responses and validate the generated examples.

Figure 10:
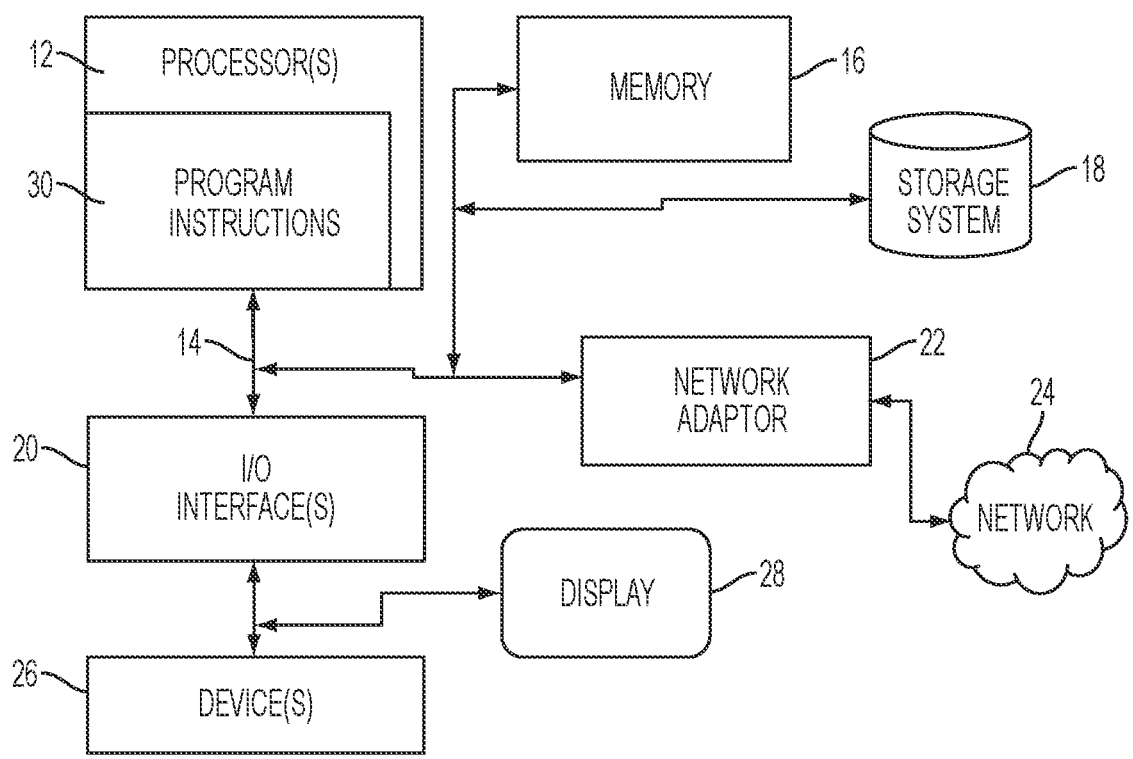
FIG. 10 illustrates a schematic of an example computer or processing system that may implement a system according to one embodiment.

FIG. 10 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
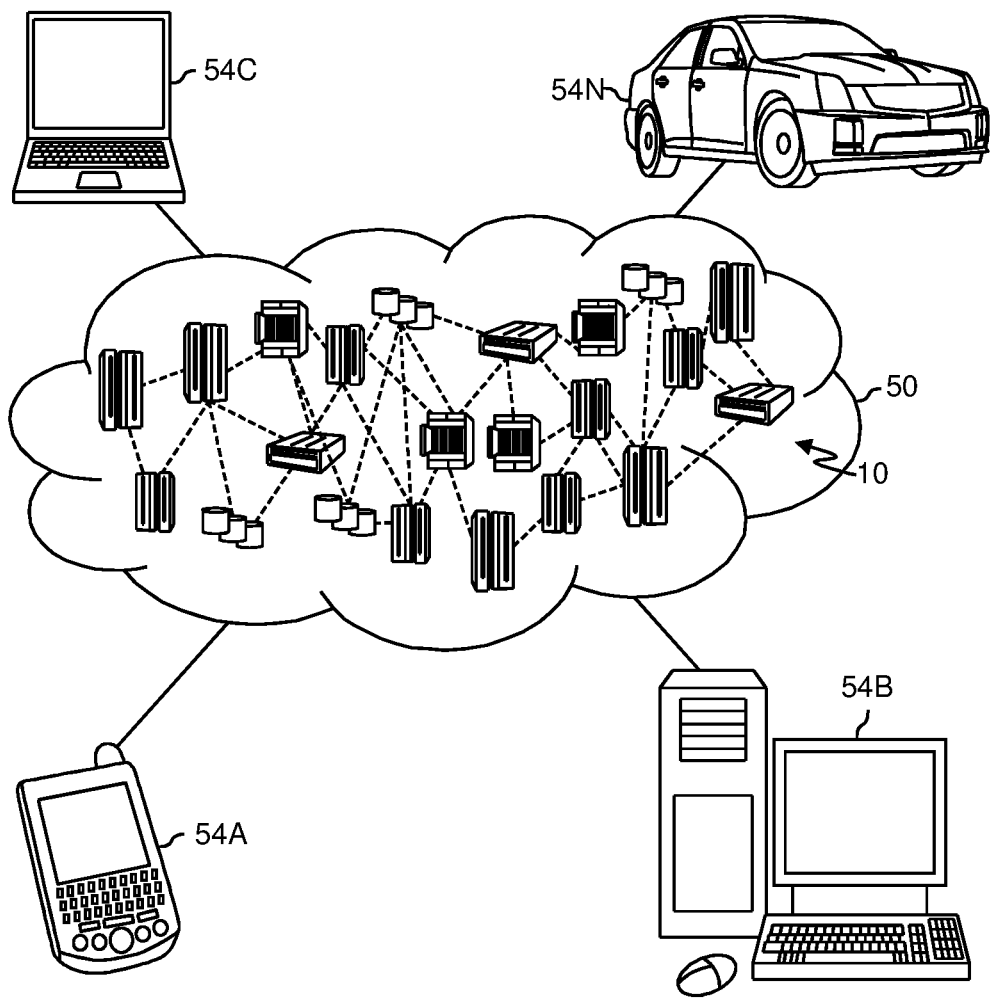
FIG. 11 illustrates a cloud computing environment in one embodiment.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
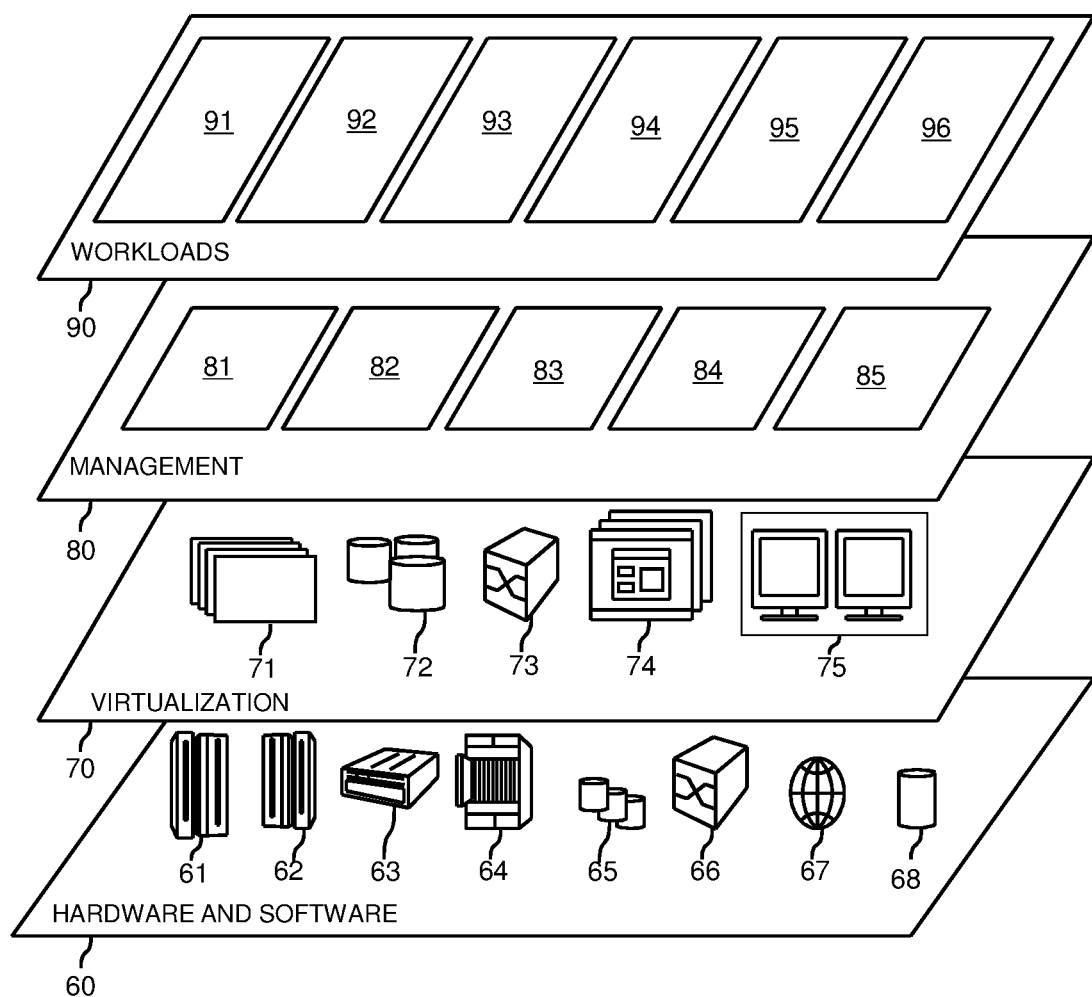
FIG. 12 illustrates a set of functional abstraction layers provided by cloud computing environment in one embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic creation of new intent processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a topic for building a new intent on which to train a chatbot;
mapping the received topic to meta-knowledge based on similarity of the topic and the meta-knowledge;
searching a database of chatbot training data for a candidate intent having the meta-knowledge;
extracting utterances associated with the candidate intent; and
inputting the received topic and the extracted utterances to a trained machine learning model, the trained machine learning model generating example utterances for the new intent, the trained machine learning model having been trained to convert a first intent to a second intent based on: a plurality of pairs of input samples, a pair of input sample in the plurality of pairs of input samples comprising a training utterance and a training utterance's meta-knowledge associated with the first intent, and using as ground truth a plurality of second intent's examples and associated meta-knowledge;
discarding an example utterance from the generated example utterances responsive to determining that the example utterance is similar, based on a threshold level of similarity, to an extracted utterance of the extracted utterances used as input in training the machine learning model;
presenting via a graphical user interface the at least the example utterances for validation of the example utterances;
training the chatbot using at least the example utterances without the discarded example utterance, generated by the trained machine learning model; and
automatically updating knowledge and retraining of the chatbot using a set of intents that includes the first intent and the converted second intent thereby causing the chatbot to interact with a user by carrying on a conversation associated with the new intent that is different from a previous intent.

2. The method of claim 1, wherein the extracted utterances include a question associated with the candidate intent, and wherein the example utterances generated by the trained machine learning model include a question associated with the topic,
the method further including generating an answer to the question by at least searching an external network for the answer for responding to the question associated with the topic, wherein the generated answer with the question is used in training the chatbot.

3. The method of claim 2, further including validating the answer.

4. The method of claim 1, wherein the machine learning model includes a neural network.

5. A system comprising:
a hardware processor; and
a memory device coupled with the hardware processor, the hardware processor configured to at least:
receive a topic for building a new intent on which to train a chatbot;
map the received topic to meta-knowledge based on similarity of the topic and the meta-knowledge;
search a database of chatbot training data for a candidate intent having the meta-knowledge;
extract utterances associated with the candidate intent; and
input the received topic and the extracted utterances to a trained machine learning model, the trained machine learning model generating example utterances for the new intent, the trained machine learning model having been trained to convert a first intent to a second intent based on: a plurality of pairs of input samples, a pair of input sample in the plurality of pairs of input samples comprising a training utterance and a training utterance's meta-knowledge associated with the first intent, and using as ground truth a plurality of second intent's examples and associated meta-knowledge;
discard an example utterance from the generated example utterances responsive to determining that the example utterance is similar, based on a threshold level of similarity, to an extracted utterance of the extracted utterances used as input in training the machine learning model;
present via a graphical user interface the at least the example utterances for validation of the example utterances;
train the chatbot using at least the example utterances without the discarded example utterance, generated by the trained machine learning model; and
automatically update knowledge and retrain the chatbot using a set of intents that includes the first intent and the converted second intent thereby cause the chatbot to interact with a user by carrying on a conversation associated with the new intent that is different from a previous intent.

6. The system of claim 5, wherein the extracted utterances include a question associated with the candidate intent, and wherein the example utterances generated by the trained machine learning model include a question associated with the topic, wherein the hardware processor is further configured to generate an answer to the question by at least searching an external network for the answer for responding to the question associated with the topic, wherein the generated answer with the question is used in training the chatbot.

7. The system of claim 6, wherein the hardware processor is further configured to validate the answer.

8. The system of claim 5, wherein the trained machine learning model includes a neural network.

9. The system of claim 5, wherein the trained machine learning model is trained based on input data including intents and associated utterances, wherein the trained machine learning model is trained to, given a new intent topic, generate example utterances associated with the new intent topic.

10. A computer program product comprising a computer readable storage medium having program instructions embodied therewith, the program instructions readable by a device to cause the device to:
receive a topic for building a new intent on which to train a chatbot;
map the received topic to meta-knowledge based on similarity of the topic and the meta-knowledge;
search a database of chatbot training data for a candidate intent having meta-knowledge similar to the received topic;
extract utterances associated with the candidate intent; and
input the received topic and the extracted utterances to a trained machine learning model, the trained machine learning model generating example utterances for the new intent, the trained machine learning model having been trained to convert a first intent to a second intent based on:
a plurality of pairs of input samples, a pair of input sample in the plurality of pairs of input samples comprising a training utterance and a training utterance's meta-knowledge associated with the first intent, and using as ground truth a plurality of second intent's examples and associated meta-knowledge;
discard an example utterance from the generated example utterances responsive to determining that the example utterance is similar, based on a threshold level of similarity, to an extracted utterance of the extracted utterances used as input in training the machine learning model;
present via a graphical user interface the at least the example utterances for validation of the example utterances;
train the chatbot using at least the example utterances without the discarded example utterance, generated by the trained machine learning model; and
automatically update knowledge and retrain the chatbot using a set of intents that includes the first intent and the converted second intent thereby cause the chatbot to interact with a user by carrying on a conversation associated with the new intent that is different from a previous intent.

11. The computer program product of claim 10, wherein the extracted utterances include a question associated with the candidate intent, and wherein the example utterances generated by the trained machine learning model include a question associated with the topic, wherein the device is further configured to generate an answer to the question by at least searching an external network for the answer for responding to the question associated with the topic, wherein the generated answer with the question is used in training the chatbot.

12. The computer program product of claim 11, wherein the device is further caused to validate the answer.

13. The computer program product of claim 10, wherein the trained machine learning model includes a neural network.

14. The computer program product of claim 10, wherein the trained machine learning model is trained based on input data including intents and associated utterances, wherein the trained machine learning model is trained to, given a new intent topic, generate example utterances associated with the new intent topic.

* * * * *